(12) United States Patent
Guo et al.

(10) Patent No.: US 8,982,568 B2
(45) Date of Patent: Mar. 17, 2015

(54) BATTERY COVER LATCHING STRUCTURE AND ELECTRONIC DEVICE EMPLOYING SAME

(75) Inventors: Jing-Zhen Guo, Shenzhen (CN); Chao-Yuan Cheng, New Taipei (TW); Chun Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 373 days.

(21) Appl. No.: 13/543,884

(22) Filed: Jul. 9, 2012

(65) Prior Publication Data

US 2013/0279124 A1 Oct. 24, 2013

(30) Foreign Application Priority Data

Apr. 19, 2012 (CN) .......................... 2012 2 0169778

(51) Int. Cl.
  *H05K 5/00* (2006.01)
  *H05K 7/00* (2006.01)
  *A47G 1/10* (2006.01)
  *E04G 3/00* (2006.01)
  *H01M 2/10* (2006.01)

(52) U.S. Cl.
  CPC .................................. *H01M 2/1066* (2013.01)
  USPC ................. 361/747; 361/679.09; 361/679.26; 361/679.3; 361/679.43; 369/75.21; 292/8; 292/4

(58) Field of Classification Search
  USPC ............... 361/679.01–679.09, 679.1–679.19, 361/679.21–679.29, 679.31–679.45, 361/679.55–679.6, 724–747; 369/75.1, 369/75.2, 75.11, 75.21, 76, 77.11, 77.21, 369/78, 79, 80, 81, 82; 248/917–924, 248/80–88, 155.1–155.5, 166–173, 248/180.1–186.2, 229.1–231.51, 271.4, 248/292.14, 316.1–316.8; 292/1–62, 113, 292/169.11–169.23, 341.11–341.19
  See application file for complete search history.

(56) References Cited

U.S. PATENT DOCUMENTS 7,983,037 B2 * 7/2011 Zhang et al. ............. 361/679.55
2007/0010219 A1 * 1/2007 Qin et al. ...................... 455/128

* cited by examiner

*Primary Examiner* — Jerry Wu
(74) *Attorney, Agent, or Firm* — Novak Druce Connolly Bove + Quigg LLP

(57) ABSTRACT

A battery cover latching structure is used to latch a battery cover to a housing of an electronic device. The battery cover includes a latching portion. The housing defines a receiving portion and a latching slot communicating to the receiving portion. The battery cover latching structure includes an urging member and a spring member elastically connected between the urging member and the housing. The urging member is rotatably connected to the housing. The urging member includes an urging portion extending into the latching slot. To close the battery cover, the latching portion is positioned on the receiving portion of the housing, and then the battery cover is pushed to allow the latching portion slide into the latching slot to engage with the urging portion to latch the batter cover to the housing.

16 Claims, 6 Drawing Sheets

BATTERY COVER LATCHING STRUCTURE AND ELECTRONIC DEVICE EMPLOYING SAME

BACKGROUND

1. Technical Field

The present disclosure generally relates to a battery cover latching structure employed in a portable electronic device.

2. Description of Related Art

Batteries are widely used in portable electronic devices, such as mobile phones. Batteries are attachably received in the electronic devices. Battery covers are designed to connect with housings of the electronic devices to package the batteries. Generally, the battery covers engage with the housings via tight-fit engagements between hooks configured on the battery covers and latching grooves defined in the housings. However, during opening or closing the battery covers, the contact surfaces between the hooks and the latching grooves are easily damaged due to friction between the battery covers and the housings.

Therefore, a need exists in the industry to overcome the described problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
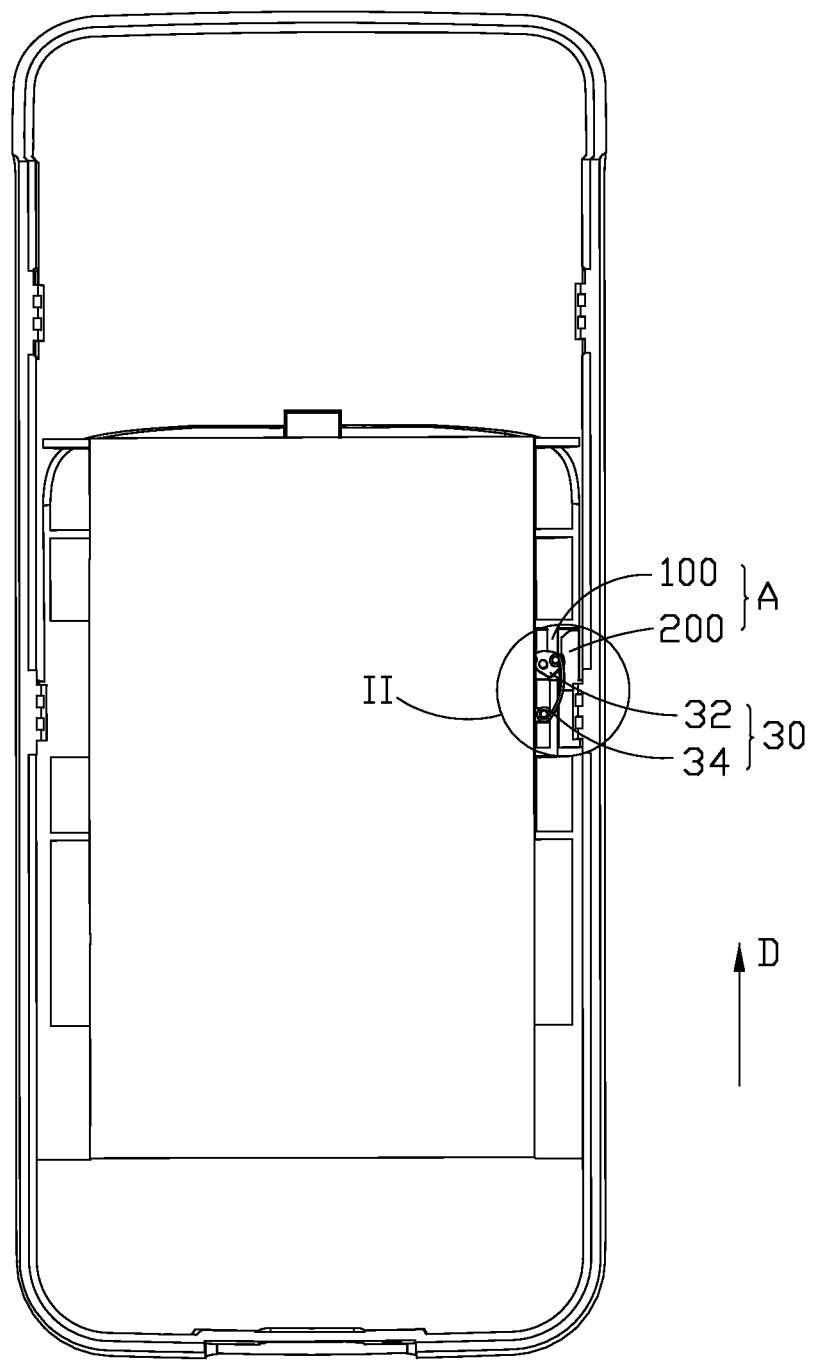
FIG. 1 is a schematic view of an electronic device employing a battery cover latching structure with an exemplary embodiment of the disclosure.

With reference to FIG. 1, an electronic device A, such as a mobile phone, comprises a housing 100 and a battery cover 200. The battery cover 200 engages with the housing 100 and slides along a direction D to be latched to the housing 100. A battery cover latching structure 30 configured on the housing 100 is used to latch the battery cover 200 to the housing 100.

Figure 2:
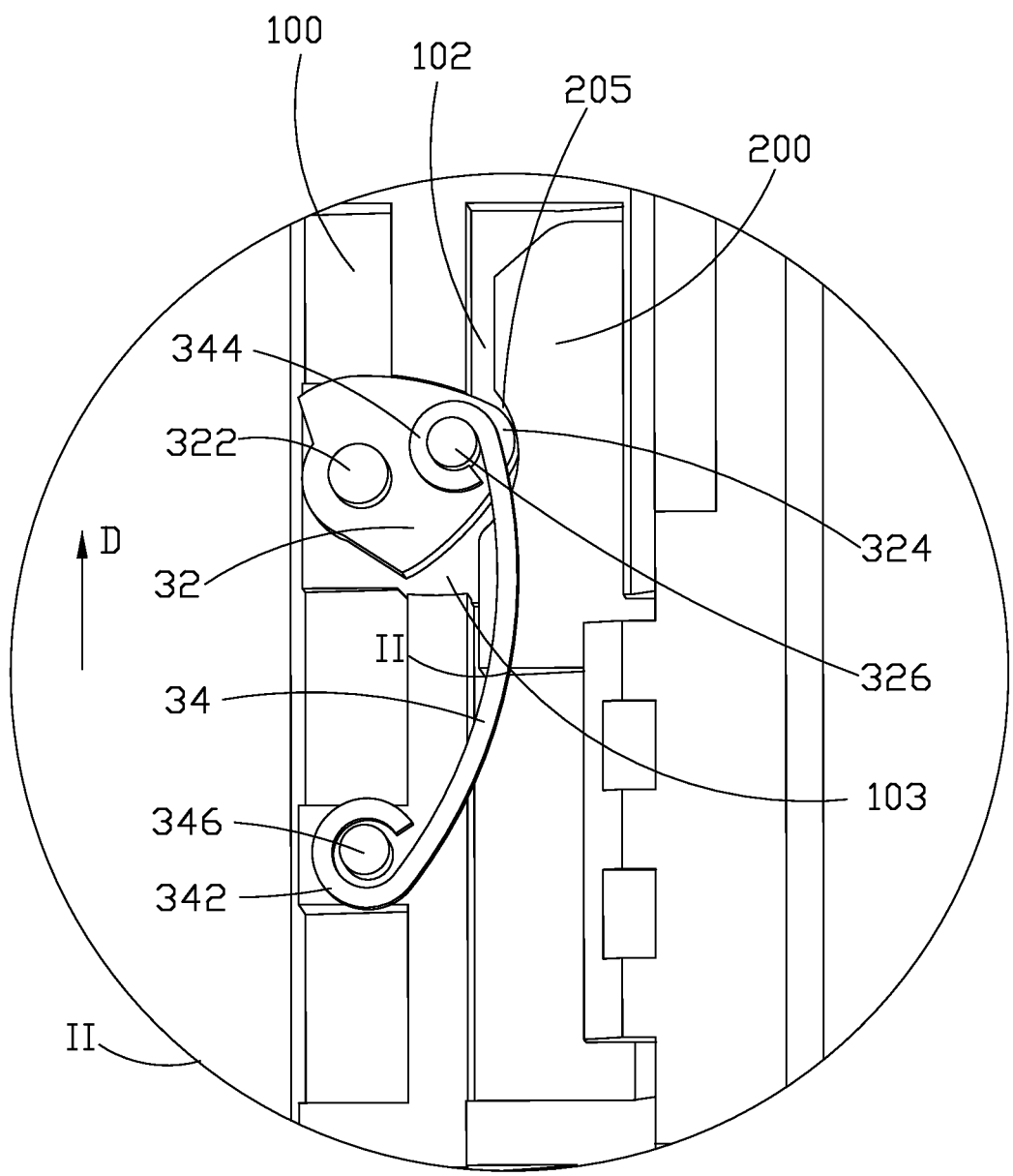
FIG. 2 is an enlarged schematic view of an area labeled as II shown in FIG. 1
Figure 3:
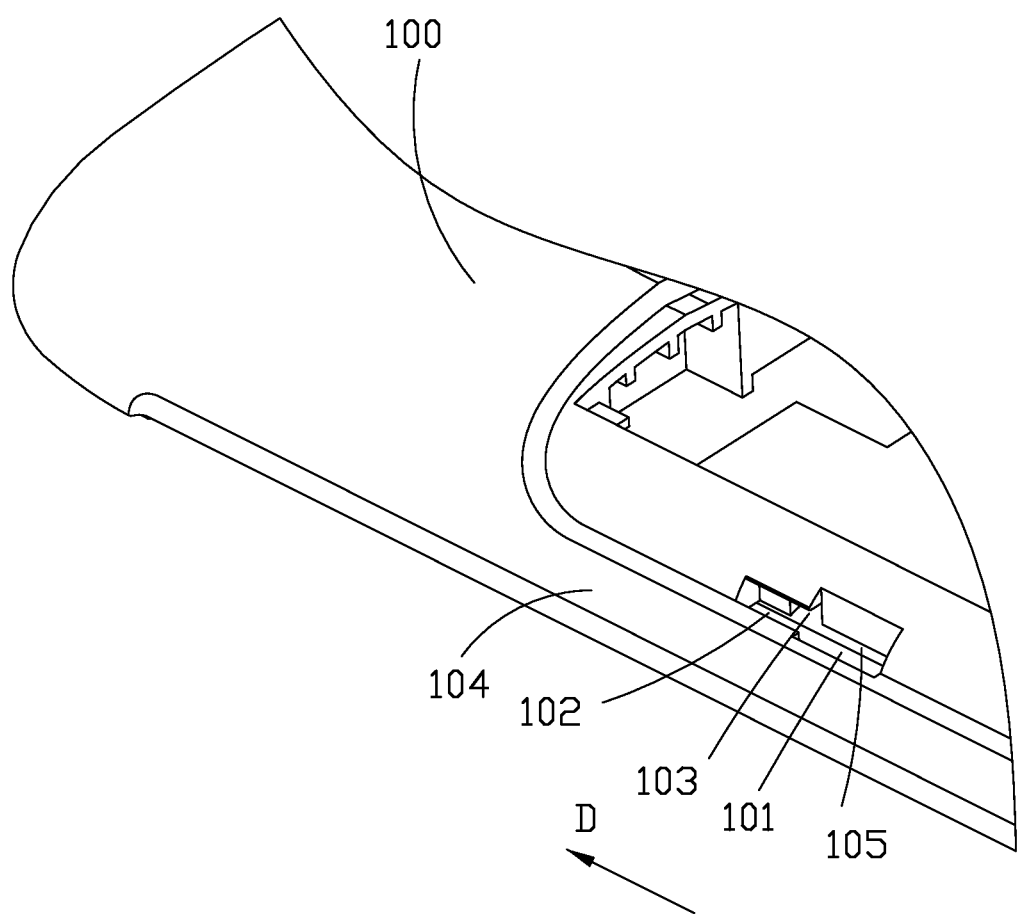
FIG. 3 is a partially enlarged schematic view of a housing of the electronic device shown in FIG. 1, showing structures configured on an outer surface of the housing.
Figure 4:
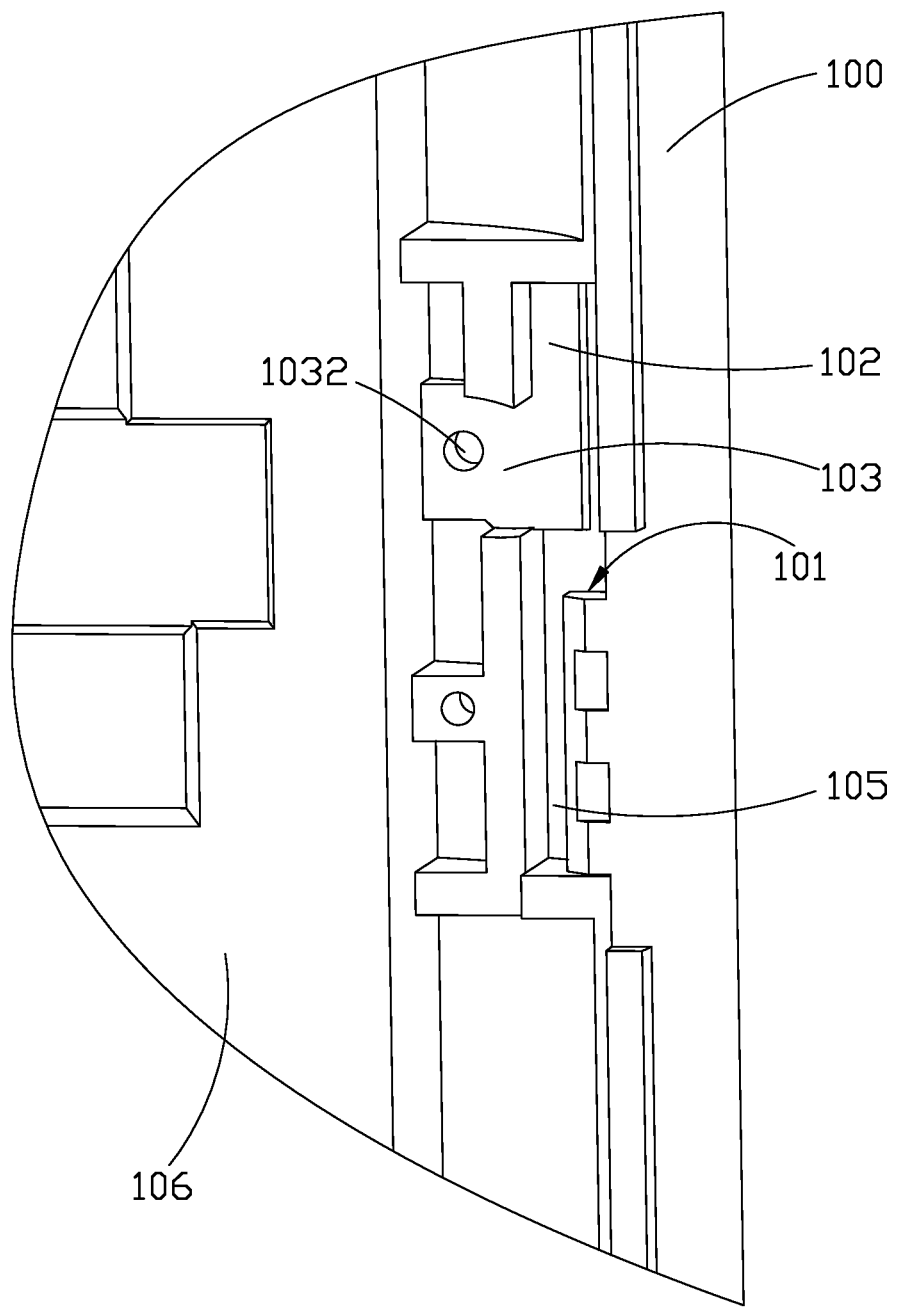
FIG. 4 is a partially enlarged schematic view of a housing of the electronic device shown in FIG. 1, showing structures configured an inner surface of the housing.

Referring to FIGS. 2-4, the housing 100 of the electronic device A comprises a receiving portion 101 and defines a latching slot 102 communicating with the receiving portion 101. The receiving portion 101 and the latching slot 102 are configured close to an edge 104 of the housing 100 and face to the battery cover 200. The housing 100 further defines a first opening 103 adjacent to the latching slot 102 and a second opening 105 adjacent to the receiving portion 101. The first opening 103 is configured to communicate the latching slot 102 with an inner room 106 of the housing 100. Similarly, the second opening 105 is configured to communicate the receiving portion 101 with the inner room 106 of the housing 100.

Figure 5:
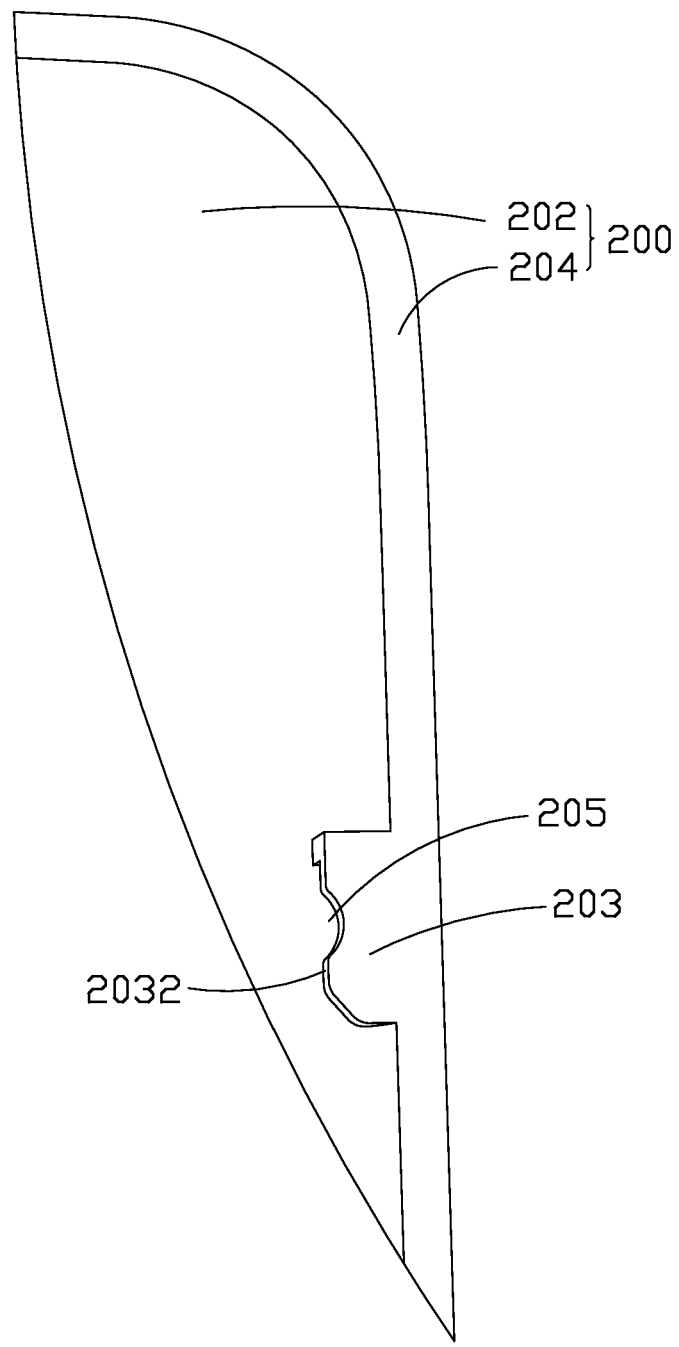
FIG. 5 is partially enlarged schematic view of a battery cover of the electronic device shown in FIG. 1.

Referring to FIG. 5, the battery cover 200 comprises a body 202, a frame 204 surrounding the body 202, and a latching portion 203 extending from the frame 204 toward center of the body 202. The latching portion 203 is received in the latching slot 102 and engages with the battery cover latching structure 30, when the battery cover 200 is secured to the housing 100. The latching portion 203 defines a securing recess 205 configured in a sidewall 2032 of the latching portion 203 away from the frame 204.

Figure 6:
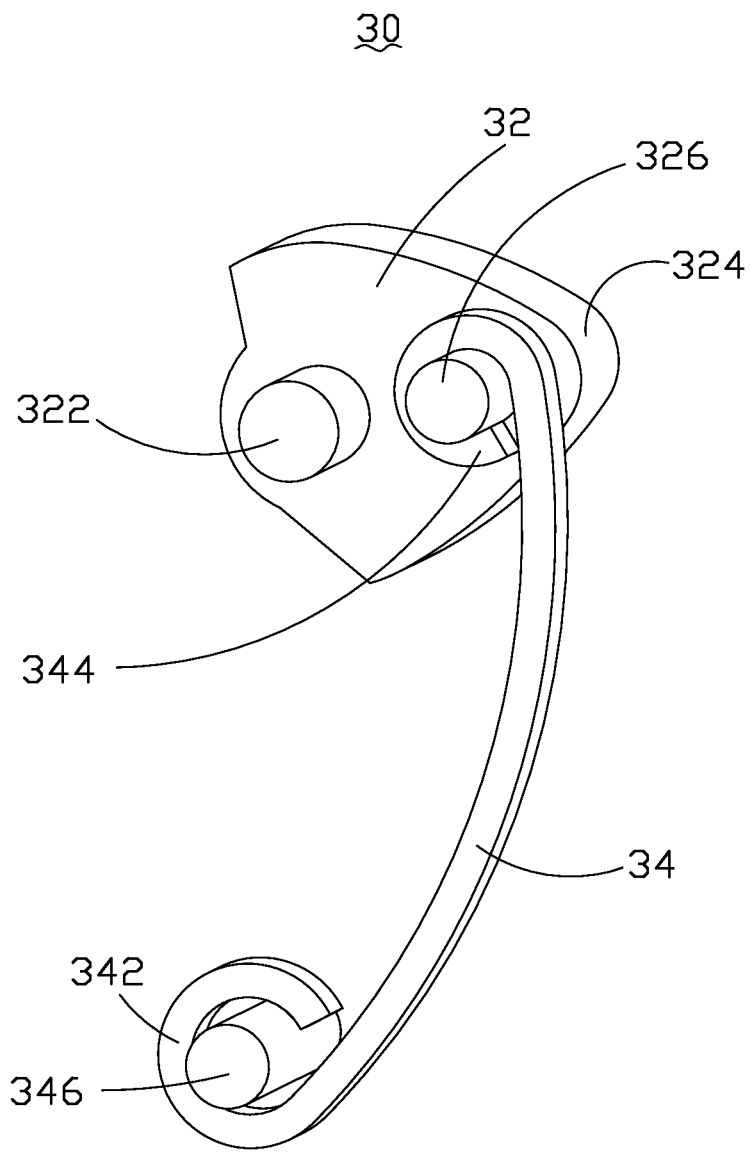
FIG. 6 is a schematic view of the battery cover latching structure of the electronic device.

Referring to FIG. 6, the battery cover latching structure 30 comprises an urging member 32 and a spring member 34. The urging member 32 comprises a first shaft 322, a second shaft 326 and an urging portion 324. The second shaft 326 is configured between the first shaft 322 and the urging portion 324. In assembly, the urging member 32 is received in the first opening 103 and rotatably connected to the housing 100 via engagement between the first shaft 322 and a shaft hole 1032 defined in the housing 100. The urging portion 324 is configured as a curved surface facing the edge 104 of the housing 100 extends into the latching slot 102 of the housing 100. The spring member 34 partially received in the second opening 105 is elastically connected between the second shaft 326 and the housing 100.

To close the battery cover 200, the latching portion 203 is positioned on the receiving portion 101 of the housing 100, and then the battery cover 200 is pushed to allow the latching portion 203 slide into the latching slot 102 and engage with the urging portion 324 of the urging member 32. Shown in FIGS. 1-3, the battery cover 200 slides on the housing 10 along the direction D to make the latching portion 203 move into the latching slot 102 to drive the urging member 32 rotate relative to the housing 100. The battery cover 200 is latched to the housing 100 due to engagement between the urging portion 324 of the urging member 32 and the latching portion 203.

In this embodiment, the spring member 34 comprises a first end 342, a second end 344 and a third shaft 346. The third shaft 346 engages with the first end 342 and is fixed to the housing 100. That is, the first end 342 of the spring member 34 is connected to the housing 100 by the third shaft 346. The second end 344 is secured to the second shaft 326 of the urging member 32. In assembly, the first end 342 and the receiving portion 101 are located on a same side of the urging member 32. The spring member 34 is configured at an original unstretched state, and the urging portion 324 of the urging member 32 faces the receiving portion 101, when the battery cover 200 is unlatched with the housing 100. In the unlatched stated of the battery cover 200, the second shaft 326 and the third shaft 346 are located on a same side of the first shaft 322, that is, the first shaft 322, the second shaft 326 and the third shaft 346 cooperatively form an acute triangle.

During installation of the battery cover 200 to the housing 100, the securing recess 205 of the battery cover 200 engages with the urging portion 324 of the urging member 32. The battery cover 200 moves to make the urging portion 324 of the urging member 32 rotate about the first shaft 322 via engagement between the securing recess 205 and the urging portion 324, and make the spring member 34 stretch. When the urging member 32 rotates to latch the battery cover 200 to the housing 100, the second shaft 326 and the third shaft 346 are respectively located on two opposite sides of the first shaft 322, that is, the first shaft 322, the second shaft 326 and the third shaft 346 cooperatively form an obtuse triangle. The spring member 34 is stretched to securely position the urging member 32 in the housing 100.

The battery cover latching structure 30 latches the battery cover 200 to the housing 100 via engagement between the urging member 32 and the securing recess 205. When the battery cover 200 is separate with the housing 100, the urging member 32 is located at a first state. When the battery cover 200 is latched with the housing 100, the urging member 32 is located at a second state. During installation of the battery cover 200 to the housing 100, when the urging member 32 rotates at a middle state between the first state and the second state, the urging member 32 and the securing recess 205 endure a maximum tight-fit engagement. That is, a friction between the urging member 32 in the second state and the latching portion 203 is less than a friction between the urging member 32 in the middle state and the latching portion 203, thus, the urging member 32 is not easily damaged by the friction between the urging member 32 and the latching portion 203 during opening or closing the battery cover 200.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A battery cover latching structure configured on a housing of an electronic device and used to latch a battery cover to the housing, the battery cover comprising a latching portion defining a securing recess, the housing defining a receiving portion and a latching slot communicating to the receiving portion, the battery cover latching structure comprising:
   an urging member, comprising a first shaft, a urging portion and a second shaft configured between the first shaft and the urging portion, the urging member rotatably connected to the housing via engagement between the first shaft and a shaft hole defined in the housing; a spring member, elastically connected between the second shaft and the housing, the spring member urges the urging portion to extending extend into the latching slot; and
   a spring member, elastically connected between the second shaft and the housing;
   wherein, to close the battery cover, the latching portion is positioned on the receiving portion of the housing, and then the battery cover is pushed to allow the latching portion to slide into the latching slot and rotate the urging portion to make the securing recess engage with the urging portion to latch the batter cover to the housing.

2. The battery cover latching structure as claimed in claim 1, wherein the urging portion is configured as a curved surface facing an edge of the housing.

3. The battery cover latching structure as claimed in claim 1, wherein the battery cover comprises a body and a frame surrounding the body, the latching portion extends from the frame toward center of the body, and the securing recess is configured in a sidewall of the latching portion away from the frame.

4. The battery cover latching structure as claimed in claim 1, wherein the housing defines a first opening configured to communicate the latching slot with an inner room of the housing and a second opening configured to communicate the receiving portion with the inner room of the housing, the urging member is received in the first opening, and the spring member is partially received in the second opening.

5. The battery cover latching structure as claimed in claim 4, wherein the spring member comprises a first end connected to the housing and a second end secured to the second shaft of the urging member.

6. The battery cover latching structure as claimed in claim 5, wherein the spring member comprises a third shaft engaging with the first end and fixed to the housing.

7. The battery cover latching structure as claimed in claim 6, wherein when the battery cover is unlatched with the housing, the first shaft, the second shaft and the third shaft cooperatively form an acute triangle.

8. The battery cover latching structure as claimed in claim 6, wherein when the battery cover is latched with the housing, the first shaft, the second shaft and the third shaft cooperatively form an obtuse triangle.

9. An electronic device, comprising: a housing, defining a receiving portion and a latching slot communicating to the receiving portion; a battery cover, comprising a latching portion defining a securing recess; and a battery cover latching structure, configured on the housing and comprising:
   an urging member, comprising a first shaft, a urging portion and a second shaft configured between the first shaft and the urging portion, the urging member rotatably connected to the housing via engagement between the first shaft and a shaft hole defined in the housing; a spring member, elastically connected between the second shaft and the housing, the spring member urges the urging portion extending into the latching slot; and a spring member, elastically connected between the second shaft and the housing; wherein, to close the battery cover, the latching portion is positioned on the receiving portion of the housing, and then the battery cover is pushed to allow the latching portion to slide into the latching slot and rotate the urging portion to make the securing recess engage with the urging portion to latch the batter cover to the housing.

10. The electronic device as claimed as claim 9, wherein the urging portion is configured as a curved surface facing an edge of the housing.

11. The electronic device as claimed in claim 9, wherein the battery cover comprises a body and a frame surrounding the body, the latching portion extends from the frame toward center of the body, and the securing recess is configured in a sidewall of the latching portion away from the frame.

12. The electronic device as claimed in claim 9, wherein the housing defines a first opening configured to communicate the latching slot with an inner room of the housing and a second opening configured to communicate the receiving portion with the inner room of the housing, the urging member is received in the first opening, the spring member is partially received in the second opening.

13. The electronic device as claimed as claim 12, wherein the spring member comprises a first end connected to the housing and a second end secured to the second shaft of the urging member.

14. The electronic device as claimed in claim 13, wherein the spring member comprises a third shaft engaging with the first end and fixed to the housing.

15. The electronic device as claimed in claim 14, wherein when the battery cover is unlatched with the housing, the first shaft, the second shaft and the third shaft cooperatively form an acute triangle.

16. The electronic device as claimed in claim 14, wherein when the battery cover is latched with the housing, the first shaft, the second shaft and the third shaft cooperatively form an obtuse triangle.

* * * * *